US012691889B2

(12) United States Patent
Shindo

(10) Patent No.: US 12,691,889 B2
(45) Date of Patent: Jul. 28, 2026

(54) ABNORMAL SOUND DIAGNOSIS SYSTEM

(71) Applicant: TOYOTA JIDOSHA KABUSHIKI KAISHA, Toyota (JP)

(72) Inventor: Yoshitaka Shindo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/634,642

(22) Filed: Apr. 12, 2024

(65) Prior Publication Data

US 2024/0400071 A1    Dec. 5, 2024

(30) Foreign Application Priority Data

May 31, 2023    (JP) ................................. 2023-090219

(51) Int. Cl.
*B60W 50/02*        (2012.01)
*B60W 50/14*        (2020.01)

(52) U.S. Cl.
CPC ........ *B60W 50/0205* (2013.01); *B60W 50/14* (2013.01); *B60W 2050/021* (2013.01); *B60W 2050/146* (2013.01); *B60W 2420/54* (2013.01)

(58) Field of Classification Search
CPC ............. B60W 50/0205; B60W 50/14; B60W 2050/021; B60W 2050/146; B60W 2420/54
See application file for complete search history.

(56) References Cited

U.S. PATENT DOCUMENTS 11,494,950 B2 * 11/2022 Yasui .................. B60W 60/001
2017/0201633 A1    7/2017 Okamoto et al.
(Continued)

FOREIGN PATENT DOCUMENTS

JP        2016-524148 A      8/2016
JP        2021-152499 A      9/2021
(Continued)

OTHER PUBLICATIONS

Sailor et al., "Unsupervised Filterbank Learning Using Convolutional Restricted Boltzmann Machine for Environmental Sound Classification," Interspeech 2017, Aug. 20-24, 2017, Stockholm, Sweden, pp. 3107-3111.
(Continued)

*Primary Examiner* — Russell Frejd
*Assistant Examiner* — Chanmin Park
(74) *Attorney, Agent, or Firm* — Oliff PLC

(57)        ABSTRACT

A storage unit for storing a database of body sensitivity data determined for each position of a sound source, a sound acquisition unit for acquiring sound data in the vehicle cabin as sound data in the vehicle cabin and monitor data as sound data outside the vehicle cabin, a body sensitivity acquisition unit for acquiring body sensitivity data corresponding to the acquired position at which the monitor data is acquired, a sound source estimation unit for calculating sound source estimation data as data of sound estimated to be generated at an abnormal sound source using the body sensitivity data and the vehicle cabin sound data, and a determination unit for determining that there is a generation source of abnormal sound in the vicinity of the acquired position when the monitor data and the sound source estimation data coincide.

4 Claims, 2 Drawing Sheets

(56) References Cited

U.S. PATENT DOCUMENTS

2022/0198845 A1    6/2022  Tabata et al.
2022/0230483 A1*   7/2022  Shindo ................. G07C 5/0833
2024/0013593 A1*   1/2024  Park .................... G07C 5/0808

FOREIGN PATENT DOCUMENTS

JP         2022-096554  A    6/2022
WO         2014202286   A1   12/2014

OTHER PUBLICATIONS

Tokozume et al., "Learning from Between-Class Examples for Deep Sound Recognition," Conference Paper at ICLR 2018, Feb. 28, 2018, Vancouver, Canada, pp. 1-13.
Tak et al., "Novel Phase Encoded Mel Filterbank Energies for Environmental Sound Classification," PReMI 2017, 2017, LNCS 10597, pp. 317-325.
Kumar et al., "Knowledge Transfer from Weakly Labeled Audio Using Convolutional Neural Network for Sound Events and Scenes," 2018, vol. 8, Carnegie Mellon University, Pittsburgh, USA.
Agrawal et al., "Novel TEO-based Gammatone Features for Environmental Sound Classification," 2017 25th European Signal Processing Conference (EUSIPCO), 2017, pp. 1859-1863.

* cited by examiner

| QUESTIONNAIRE | |
|---|---|
| VEHICLE TYPE : XXXXX–XXXXXXX | |
| REQUIREMENTS | > |
| ABNORMAL NOISE DURING MORNING START-UP | |
| DATE AND TIME OF OCCURRENCE | > |
| OOOO/OO/OO  □□:□□ | |
| FREQUENCY OF OCCURRENCE | > |
| ONCE A DAY | |
| SOUND TYPE | > |
| RATTLE | |

| RECEPTION | INPUT | RECORDING |
|---|---|---|

FIG. 3

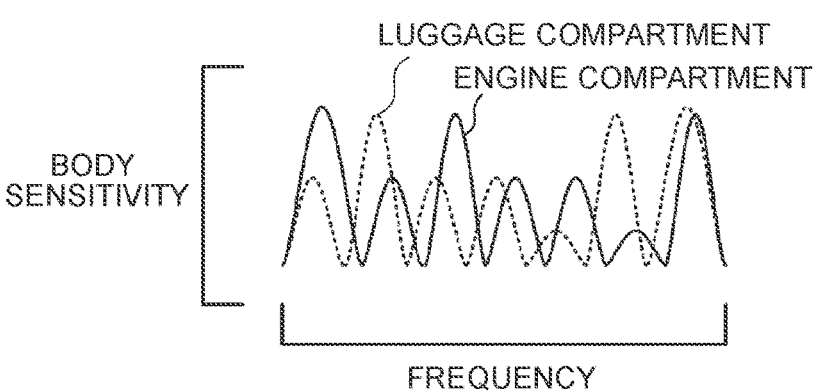

LUGGAGE COMPARTMENT

ENGINE COMPARTMENT

BODY
SENSITIVITY

FREQUENCY

FIG. 4

```
        ┌──────────────────────────────┐
        │   DECISION PROCESSING        │
        │        ROUTINE               │
        └──────────────────────────────┘
                     │
        ┌──────────────────────────────┐
        │     ACQUIRES DATA OF         │
        │   VEHICLE CABIN SOUNDS       │ ~S100
        │    AND MONITOR DATA          │
        └──────────────────────────────┘
                     │
        ┌──────────────────────────────┐
        │   OBTAIN BODY SENSITIVITY    │
        │    DATA BASED ON SOUND       │ ~S110
        │   ACQUISITION POSITION       │
        └──────────────────────────────┘
                     │
        ┌──────────────────────────────┐
        │  SOUND SOURCE ESTIMATION     │
        │ DATA IS CALCULATED BASED ON  │ ~S120
        │  BODY SENSITIVITY DATA AND   │
        │  VEHICLE CABIN SOUND DATA    │
        └──────────────────────────────┘
                     │
               ◇ MONITOR            ~S130
        NO  DATA MATCHES SOURCE
           ESTIMATE DATA?
                     │ YES
```

S140

DETERMINATION THAT THERE IS
NO ABNORMAL SOUND SOURCE
IN THE VICINITY OF THE SOUND
ACQUISITION POSITION

DETERMINE THAT THERE IS
AN ABNORMAL SOUND SOURCE     ~S150
IN THE VICINITY OF THE SOUND
ACQUISITION POSITION

TRANSMISSION OF
THE JUDGMENT RESULT          ~S160

STOP

ABNORMAL SOUND DIAGNOSIS SYSTEM

CROSS-REFERENCE TO RELATED APPLICATION

This application claims priority to Japanese Patent Application No. 2023-090219 filed on May 31, 2023, incorporated herein by reference in its entirety.

BACKGROUND

1. Technical Field

The present disclosure relates to an abnormal sound diagnosis system.

2. Description of Related Art

Conventionally, there has been proposed an abnormal sound diagnosis system that estimates the generation position of an abnormal sound in a vehicle (see Japanese Unexamined Patent Application Publication No. 2022-96554 (JP 2022-96554 A), in particular). In this system, candidates for the generation position at which an abnormal sound is generated are extracted based on a map of the generation positions of known abnormal sounds associated with the traveling state of the vehicle and the traveling state of the vehicle at the time when a specific abnormal sound is generated, a sound is collected in a vehicle cabin, and it is determined whether a predetermined candidate for the generation position is possibly the actual generation position of the abnormal sound based on a frequency portion of the sound pressure of the collected sound.

SUMMARY

In the above-described abnormal sound diagnosis system, a map of the generation positions of known abnormal sounds is used, and thus it is difficult to specify the generation position of an unknown abnormal sound when such an unknown abnormal sound is generated.

An abnormal sound diagnosis system according to the present disclosure has a main object to specify the generation position of even an unknown abnormal sound.

The abnormal sound diagnosis system according to an aspect of the present disclosure adopts the following means in order to achieve the above-described main object.

An aspect of the present disclosure provides an abnormal sound diagnosis system that diagnoses an abnormal sound generated in a vehicle, including:

a storage unit that stores a database of body sensitivity data determined for each position of a sound source located outside a vehicle cabin as a ratio of a sound pressure of a sound propagated from the sound source into the vehicle cabin to a sound pressure of a sound generated by the sound source;

a sound acquisition unit that acquires vehicle cabin internal sound data as data on a sound from inside the vehicle cabin and monitor data as data on a sound from outside the vehicle cabin;

a body sensitivity acquisition unit that acquires the body sensitivity data corresponding to an acquisition position at which the monitor data are acquired;

a sound source estimation unit that calculates sound source estimation data as data on a sound estimated as being generated from an abnormal sound generation source using the body sensitivity data and the vehicle cabin internal sound data; and a determination unit that determines that the abnormal sound generation source is located in a vicinity of the acquisition position when the monitor data and the sound source estimation data coincide with each other.

The abnormal sound diagnosis system according to the present disclosure stores a database of body sensitivity data determined for each position of a sound source located outside a vehicle cabin as a ratio of a sound pressure of a sound propagated from the sound source into the vehicle cabin to a sound pressure of a sound generated by the sound source. The abnormal sound diagnosis system acquires vehicle cabin internal sound data as data on a sound from inside the vehicle cabin and monitor data as data on a sound from outside the vehicle cabin. Then, the abnormal sound diagnosis system acquires the body sensitivity data corresponding to an acquisition position at which the monitor data are acquired. Further, the abnormal sound diagnosis system calculates sound source estimation data as data on a sound estimated as being generated from an abnormal sound generation source using the body sensitivity data and the vehicle cabin internal sound data. Then, the abnormal sound diagnosis system determines that the abnormal sound generation source is located in a vicinity of the acquisition position when the monitor data and the sound source estimation data coincide with each other. With this configuration, it is possible to specify the position of the generation source of the abnormal sound without acquiring data on the abnormal sound in advance. As a result, it is possible to specify the generation position of even an unknown abnormal sound.

In the abnormal sound diagnosis system according to an aspect of the present disclosure, the abnormal sound diagnosis system may further include a diagnosis unit that diagnoses a cause of the abnormal sound using the acquisition position when the monitor data and the sound source estimation data coincide with each other.

With this configuration, it is possible to specify the cause of the abnormal sound with higher accuracy.

The abnormal sound diagnosis system may further include an informing unit that informs a user of a result of a determination by the determination unit when the monitor data and the sound source estimation data coincide with each other.

With this configuration, it is possible to allow a user to recognize that the generation position of the abnormal sound has been successfully specified.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is an explanatory diagram illustrating an exemplary data of body sensitivity stored in the database D; and FIG. 4 is a diagram illustrating an exemplary determination process executed by the server 20 when determining the position where abnormal sound is generated.

DETAILED DESCRIPTION OF EMBODIMENTS

Figures 1, 2:
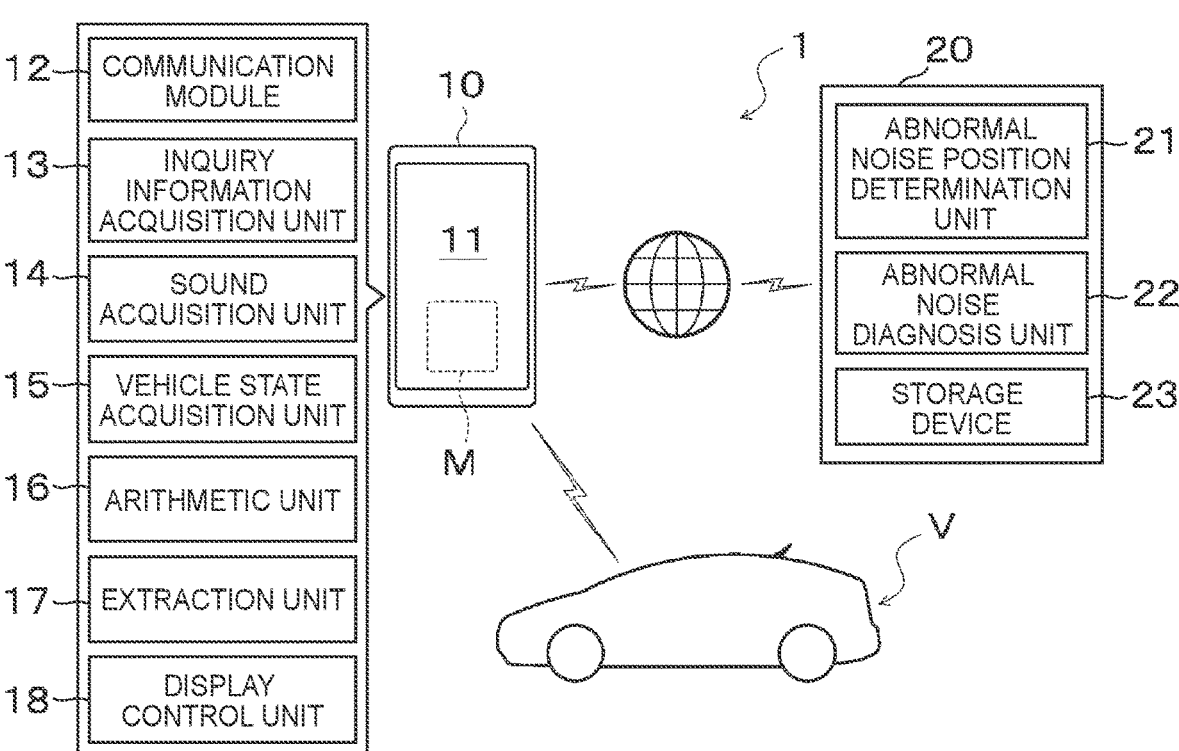
FIG. 1 is a schematic configuration diagram showing an abnormal sound diagnosis system 1 of the present disclosure.
FIG. 2 is an explanatory diagram illustrating an input screen (questionnaire) and an input example of the inquiry information displayed on the display unit 11 (or the website) of the mobile terminal 10.

Next, an embodiment for carrying out the present disclosure will be described.

FIG. 1 is a schematic configuration diagram illustrating an abnormal sound diagnosis system 1 according to the present disclosure. The abnormal sound diagnosis system 1 shown in FIG. 1 is for diagnosing a cause of abnormal noise generated in a vehicle V as an object such as a vehicle in which only an engine is mounted as a power generation source, a hybrid electric vehicle in which an engine and a motor are mounted as a power generation source, and a battery electric vehicle (fuel cell electric vehicle) in which only a motor is mounted as a power generation source. The abnormal sound diagnosis system 1 includes a mobile terminal 10 and a server 20 capable of exchanging information with the mobile terminal 10 by communication.

The mobile terminal 10 is used by a worker (a user of the abnormal sound diagnosis system 1) such as a vehicle dealer or a maintenance shop when a response to an owner of the vehicle V or the like (a user of the vehicle V) in which an abnormal sound is generated or a reproduction test in which the vehicle V is traveled (operated) on a roadway or a test bench to reproduce an abnormal sound is executed. In the present embodiment, the mobile terminal 10 is a smart phone including a SoC, ROM, RAM including a CPU and a GPU, an auxiliary storage device (flash memory) M, a display unit 11, a communication module 12, a microphone (not shown), and the like, and an abnormal sound diagnosis support application (program) is installed in the mobile terminal 10. As shown in FIG. 1, the mobile terminal 10 includes an abnormal sound diagnosis support application (software), an inquiry information acquisition unit 13, a sound acquisition unit 14, a vehicle state acquisition unit 15, a calculation processing unit 16, an extraction unit 17, and a display control unit 18. The inquiry information acquisition unit 13, the sound acquisition unit 14, the vehicle state acquisition unit 15, the calculation processing unit 16, the extraction unit 17, and the display control unit 18 are constructed in cooperation with hardware such as the display unit 11, the communication module 12, SoC, ROM, RAM, and the microphones.

The display unit 11 of the mobile terminal 10 includes a touch panel type liquid crystal panel, an organic EL panel, or the like. The communication module 12 exchanges various kinds of information with the electronic control unit of the vehicle V via short-range wireless communication or a cable (dongle), and exchanges various kinds of information with the server 20 via a network such as the Internet. The inquiry information acquisition unit 13 is constructed by cooperation of the abnormal sound diagnosis support application and the display unit 11, the communication module 12, SoC, ROM, RAM, and the like, and acquires, via the display unit 11 or the communication module 12, information (hereinafter, referred to as "inquiry information") indicating the status of the vehicle V at the time of the occurrence of the abnormal sound provided from the owner of the vehicle V or the like. The inquiry information may be input to the mobile terminal 10 via the display unit 11 by an operator such as a vehicle dealer who has heard from the owner of the vehicle V or the like. In addition, the inquiry information may be input by the owner of the vehicle V or the like from his or her personal information terminal, personal computer, or the like into a dedicated web page provided by the server 20, for example. In this case, the mobile terminal 10 acquires the inquiry information from the server 20 via the communication module 12 in response to the operation of the worker.

FIG. 2 illustrates an input screen (questionnaire) and an input example of the inquiry information displayed on the display unit 11 (or the website) of the mobile terminal 10. As shown in a part of FIG. 2, the inquiry information includes vehicle type information, commission, occurrence date and time, occurrence frequency, type of sound, physical quantity that changes when the vehicle V travels, such as vehicle speed, driving state of the vehicle V, warm-up effect in the engine-mounted vehicle, selection items selected by the driver during driving of the vehicle V, traveling environment information of the vehicle V, and the like. The vehicle type information is information for specifying a vehicle type of the vehicle V, such as a vehicle carriage number or a vehicle identification number. The orders are detailed contents of the occurrence state of the abnormal sound provided by the owner of the vehicle V or the like. The occurrence frequency is selected by an operator or an owner or the like from a pre-prepared drop-down list including options such as always, several times/day, once/day, several times/week, once/week, once or less than once/month.

The type of sound is selected by the operator or the owner, etc., from a drop-down list including a plurality of pseudo-voices (for example, rattling, rattling, catching, key, key, etc.) corresponding to any unusual sounds generated in the vehicle V, respectively, that is recognized to be similar to the unusual sounds actually generated by the owner, etc. of the vehicle V. The physical quantity includes the vehicle speed, the engine speed, the motor speed, ON/OFF time of the brake ramp switch, the steering angle, SOC of hybrid electric vehicle or battery electric vehicle high-voltage battery (e.g., fully charged, usually any of very low), and the like. The physical quantity is heard by the operator from the owner of the vehicle V or is input by the owner or the like.

The operating condition of the vehicle V is selected by the operator or the owner from a drop-down list including options such as starting, idling, stopping, starting, accelerating, constant speed running, decelerating (braking OFF), braking (braking ON), backward, turning, motor running in hybrid electric vehicle (with/without engine drive (charge)), hybrid running in hybrid electric vehicle (driven by engine and motor), etc. The warm-up effect is selected by the operator or owner, etc. from a drop-down list that includes options such as cold, warm, cold and warm. The selection items include shift positions (any of P, R, N, D, B, S, etc.), driving modes (any of normal, power, eco, snow, and comfort, for example), operating states of accessories (ON/OFF states of air conditioners and headlights), and the like, and are selected by an operator or an owner from the drop-down list. The traveling environment information includes a road surface condition such as a stepped road, a rough road surface, a flat road, an uphill road, and a downhill road, weather such as sunny, cloudy, rain, and snow, and is selected by an operator or an owner from the drop-down list. It is needless to say that not all of the plurality of items are provided by the owner of the vehicle V or the like, but the inquiry information is provided within a range known by the owner of the vehicle V or the like.

The sound acquisition unit 14 is constructed by cooperation of an abnormal sound diagnosing support application, a SoC, ROM, RAM, a vehicle cabin microphone mounted in the vehicle cabin, a microphone mounted or fixed outside the vehicle cabin, and the like, and acquires time-axis data of sound (sound pressure) in the vehicle cabin and sound outside the vehicle cabin when a reproduction test is executed. The vehicle state acquisition unit 15 is constructed by the cooperation of the abnormal sound diagnosis support application and SoC, ROM, RAM, the display unit 11, the communication module 12, and the like, and acquires information indicating the state of the vehicle V (hereinafter, "vehicle state information") in synchronization with the acquisition of the time-axis data of the sound by the sound acquisition unit 14 when the reproduction test is executed. The vehicle status information includes a plurality of physical quantities (for example, a vehicle speed, an engine speed, a motor speed, an ON/OFF time of a brake lamp switch, a steering angle, a SOC of a hybrid electric vehicle or a battery electric vehicle high-voltage battery, and the like) corresponding to the items of the inquiry information. The vehicle state information includes information calculated or detected by an electronic control unit of the vehicle V, various sensors, or the like and acquired via the communication module 12, and information input by an operator or the like from the display unit 11 based on the inquiry information before the start of the reproduction test or the like. The calculation processing unit 16 is constructed by cooperation of the abnormal sound diagnosis support application and SoC, ROM, RAM, and the like, and executes analysis processing of the time-axis data of the sound acquired by the sound acquisition unit 14. The extraction unit 17 is constructed by cooperation of the abnormal sound diagnostic support application and SoC, ROM, RAM, and the like, and narrows down the analysis process performed by the calculation processing unit 16 based on the inquiry information and the like described above. The display control unit 18 is constructed by cooperation of an abnormal sound diagnostic support application and a SoC, ROM, a RAM, and the like, and controls the display unit 11.

The server 20 of the abnormal sound diagnosis system 1 is a computer (information processing device) including a CPU, ROM, RAM, an input/output device, and the like, and is installed and managed by, for example, an automobile manufacturer who manufactures the vehicle V in the present embodiment. In the server 20, an abnormal sound position determination unit 21 for diagnosing a position where abnormal sound is generated in the vehicle V and an abnormal sound diagnosis unit 22 for diagnosing abnormal sound generated in the vehicle V are constructed by cooperation of hardware such as a CPU and a ROM, RAM and an abnormal sound diagnosis application (program) installed in advance. The abnormal sound position determination unit 21 specifies the position of the abnormal sound generation source based on the interview information acquired by the mobile terminal 10, time axis data of the sound, and the like. Details of the abnormal sound position determination unit 21 will be described later. The abnormal sound diagnosis unit 22 includes a neural network (convolutional neural network) constructed by supervised learning (machine learning) so as to diagnose a component that is a cause of abnormal sound generated in the vehicle V or a source of abnormal sound based on the interview information acquired by the mobile terminal 10, time-axis data of sound, and the like. The teacher data used in the construction of the abnormal sound diagnosis unit 22 includes, for each of a plurality of abnormal sounds found to be generated in the vehicle V, time axis data of sounds acquired for a time range including a timing at which abnormal sounds are generated, contents (values) of each item of the inquiry information, and the like. Further, in the server 20, when the occurrence of a new abnormal sound in the vehicle V is found, the re-learning of the abnormal sound diagnosis unit 22 using the time axis data of the sound acquired for the new abnormal sound, the contents of each item of the inquiry information, and the like as the teacher data is executed. As a technique for constructing the abnormal sound diagnosis unit 22, for example, one described in the following papers (1) to (5) or a combination thereof can be used.

(1) "CNN with filterbanks learned using convolutional RBM+fusion with GTSC and mel energies" and "CNN with filterbanks learned using convolutional RBM+fusion with GTSC" described in "Unsupervised Filterbank Learning Using Convolutional Restricted Boltzmann Machine for Environmental Sound Classification"

(2) "EnvNet-v2 (tokozume2017a)+data augmentation+Between-Class learning" and "EnvNet-v2 (tokozume2017a)+Between-Class learning" described in "LEARNING FROM BETWEEN-CLASS EXAMPLES FOR DEEP SOUND RECOGNITION"

(3) "CNN working with phase encoded mel filterbank energies (PEFBEs)" described in "Novel Phase Encoded Mel Filterbank Energies for Environmental Sound Classification", fusion with Mel energies"

(4) "CNN pretrained on AudioSet" described in "Knowledge Transfer from Weakly Labeled Audio using Convolutional Neural Network for Sound Events and Scenes"

(5) "Fusion of GTSC & TEO-GTSC with CNN" described in "Novel TEO-based Gammatone Features for Environmental Sound Classification"

Further, the server 20 includes a storage device 23 that stores, for each vehicle type, a database D that stores data of body sensitivities determined for each position of the sound source as a ratio of sound pressure of sound propagated from the sound source to the vehicle cabin with respect to sound pressure of sound generated by a sound source outside the vehicle cabin. FIG. 3 is an explanatory diagram illustrating an example of body sensitivity data stored in the database D. The database D stores the relationship between the frequency and the body sensitivity for each position of the sound source outside the vehicle cabin. In the figure, the solid line indicates the relationship between the frequency and the body sensitivity when the sound source is in the engine compartment. The dashed line is the relationship between the frequency and body sensitivity when the sound source is in the trunk room.

Next, an abnormal sound position determination procedure and an abnormal sound diagnosis procedure by the abnormal sound diagnosis system 1 will be described.

When a worker such as a vehicle dealer or a maintenance factory is requested to eliminate an abnormal sound from the owner of the vehicle V or the like, the worker hears the inquiry information from the owner or the like or acquires the inquiry information from the server 20 and then executes a reproduction test for acquiring information necessary for diagnosis of the abnormal sound. When the reproduction test is executed, the operator (user) activates the abnormal sound diagnosis support application of the mobile terminal 10, and taps the recording button displayed on the display unit 11. Further, the operator inputs necessary information among the inquiry information provided from the owner or the like to the input screen displayed on the display unit 11, and connects the mobile terminal 10 to the electronic control device of the target vehicle. As described above, the mobile terminal 10 and the electronic control device of the target vehicle may be connected by short-range wireless communication or may be connected via a cable (dongle). Then, when the operator turns on the start switch (IG switch) of the vehicle V, the mobile terminal 10 acquires vehicle information such as the vehicle carriage number or the vehicle identification number of the vehicle V from the electronic control device. However, the vehicle information may be input to the mobile terminal 10 by the operator.

Further, the worker installs a microphone at or near a position assumed to be an car position of the occupant in the vehicle cabin of the vehicle V. The mobile terminal 10 is placed or fixed at a predetermined sound acquisition position outside the vehicle cabin of the vehicle V, such as an engine compartment, a door, or a trunk room. When an external microphone is connected to the mobile terminal 10, the external microphone is installed at a sound acquisition position. Next, the operator taps the recording start button displayed on the display unit 11, and causes the vehicle V to travel (operate) on the roadway or the test platform, and reproduces the traveling state in which the abnormal sound is generated based on the inquiry information from the owner or the like of the vehicle V. While the vehicle V travels (operates), the sound acquisition unit 14 of the mobile terminal 10 acquires the time axis data of the sound collected by the microphone in the vehicle cabin and the microphone outside the vehicle cabin (the mobile terminal 10 or the external microphone in the case where the external microphone is connected to the mobile terminal 10) every predetermined time (minute time). The vehicle state acquisition unit 15 acquires the vehicle state information from the electronic control unit of the vehicle V every predetermined time (minute time) in synchronization with the acquisition of the time axis data of the sound by the sound acquisition unit 14. The sound acquisition unit 14 and the vehicle state acquisition unit 15 acquire the time axis data of the sound and the vehicle state information until the recording stop button displayed on the display unit 11 is tapped by the operator in response to the stop of the vehicle V or the like. When the acquisition of the time axis data of the sound and the vehicle state information is completed, the calculation processing unit 16 and the extraction unit 17 of the mobile terminal 10 execute the analysis processing of the time axis data of the sound in the vehicle cabin and the time axis data of the sound outside the vehicle cabin. The calculation processing unit 16 performs STFT (Short-Time Fourier Transform) on each of the time axis data of the sound in the vehicle cabin and the time axis data of the sound outside the vehicle cabin acquired by the sound acquisition unit 14, and acquires a first spectrogram (first acoustic spectrogram) indicating the relationship between the time of the sound in the vehicle cabin and the frequency and the sound pressure, and a second spectrogram (second acoustic spectrogram) indicating the relationship between the time of the sound outside the vehicle cabin and the frequency and the sound pressure, and transmits the first and second spectrograms to the server 20 together with the sound acquisition position.

FIG. 4 is a flowchart illustrating an example of a determination process executed by the server 20 when determining the occurrence position of the abnormal sound. When the sound acquisition position and the first and second spectrograms are transmitted from the mobile terminal 10 to the server 20, the abnormal sound position determination unit 21 of the server 20 acquires the vehicle cabin sound data, which is the relationship between the frequency and the sound pressure in the first spectrogram, and the monitor data, which is the relationship between the frequency and the sound pressure in the second spectrogram, on the basis of the first and second spectrograms given from the mobile terminal 10 (S100).

Subsequently, the body sensitivity data is acquired based on the sound acquisition position (S110). The body sensitivity data is acquired by deriving the body sensitivity data corresponding to the sound acquisition position from the database D stored in the storage device 23. When the body sensitivity data is acquired, the sound source estimation data as the data of the sound estimated to be generated in the abnormal sound generation source is acquired using the body sensitivity data and the vehicle cabin sound data (S120). The sound source estimation data is calculated by dividing the vehicle cabin sound data by the body sensitivity data for each frequency. When the sound source estimation data is acquired, it is determined whether or not the monitor data matches the acquired sound source estimation data (S130). Whether or not the monitor data and the sound source estimation data coincide with each other is determined by comparing the sound pressure of the monitor data for each frequency with the sound pressure of the sound source estimation data, and determining that the monitor data coincides with the sound source estimation data when the difference between the sound pressure of the monitor data and the sound pressure of the sound source estimation data is small enough to determine that the sound pressure of the monitor data coincides with the sound pressure of the sound source estimation data.

When the monitor data and the acquired sound source estimation data do not coincide with each other in S130, it is determined that there is no abnormal sound generation source in the vicinity of the sound acquisition position (S140), and the determination is transmitted to the mobile terminal 10 (S160), and the routine is ended. Upon receiving the determination result, the mobile terminal 10 displays the received determination result on the display unit 11. In this way, it is possible to allow the user to recognize that the acquisition position is not the generation position of the abnormal sound. In this case, the user is installed at a sound acquisition position different from the microphone outside the vehicle cabin (the mobile terminal 10 or the external microphone when the external microphone is connected to the mobile terminal 10), and acquires the time axis data of the sound inside the vehicle cabin, the time axis data of the sound outside the vehicle cabin, and the vehicle state information again. Then, the time axis data of the sound in the vehicle cabin and the time axis data of the sound outside the vehicle cabin are subjected to STFT, and a first spectrogram (first acoustic spectrogram) indicating the relationship between the time of the sound in the vehicle cabin and the frequency and the sound pressure, and a second spectrogram (second acoustic spectrogram) indicating the relationship between the time of the sound outside the vehicle cabin and the frequency and the sound pressure are acquired, and the first and second spectrograms are transmitted to the server 20 together with the sound acquisition position. The server 20 executes the processing illustrated in FIG. 4 again to determine whether or not the sound acquisition position is the generation position of the abnormal sound.

When the monitor data and the acquired sound source estimation data coincide with each other in S130, it is determined that there is an abnormal sound generation source in the vicinity of the sound acquisition position (S150), and the determination result, the sound acquisition position, and the second spectrum are transmitted to the mobile terminal 10 (S160), and this routine is ended. Upon receiving the determination result, the mobile terminal 10 displays the received determination result on the display unit 11. In this way, it is possible to allow the user to recognize that the abnormal sound generation source is in the vicinity of the sound acquisition position, that is, that the generation position of the abnormal sound can be specified. In the present embodiment, since the generation position of the abnormal sound is specified by using the sound data in the vehicle cabin and the sound data outside the vehicle cabin acquired by the mobile terminal 10 and the database D of the body sensitivity acquired in advance and stored in the storage device 23 at the time of the abnormal sound diagnosis, the operator can specify the generation position of the unknown abnormal sound.

When the abnormal sound generation position is identified in this way, the second spectrogram is displayed on the display unit 11 of the mobile terminal 10. When a spectrogram is displayed on the display unit 11 of the mobile terminal 10, the operator taps a selection instruction button displayed on the display unit 11, and causes the mobile terminal 10 to extract (select) a range (hereinafter, referred to as "analysis range") to be analyzed by the abnormal sound diagnosis unit 22 (server 20) in the spectrogram, or selects (designates) an analysis range using his fingertip on the display unit 11, and transmits the analysis range to the server 20. The abnormal sound diagnosis unit 22 of the server 20 diagnoses the cause of the abnormal sound generated in the vehicle V on the basis of the second spectrogram at the sound acquisition position determined to have the abnormal sound generation source, the interview information, and the analysis range, and transmits the diagnosis result to the mobile terminal 10. The diagnosis result includes a cause of abnormal noise generated in the vehicle V, a component that is a generation source of abnormal noise, and a measure for eliminating the abnormal noise read from the storage device 23. In this way, the cause of the abnormal sound can be identified with higher accuracy by diagnosing the cause of the abnormal sound after the generation position of the abnormal sound is identified in advance.

According to the abnormal sound diagnosis system 1 of the embodiment described above, the vehicle cabin sound data as the data of the sound in the vehicle cabin and the monitor data as the data of the sound outside the vehicle cabin are acquired, the body sensitivity data corresponding to the acquired position at which the monitor data is acquired is acquired, and the sound source estimation data as the data of the sound estimated to be generated in the abnormal sound generation source is calculated using the body sensitivity data and the vehicle cabin sound data, and when the monitor data and the sound source estimation data coincide with each other, it is determined that there is a generation source of the abnormal sound in the vicinity of the sound acquisition position, so that the generation position can be specified even if the unknown abnormal sound is generated.

Further, when the monitor data and the sound source estimation data coincide with each other, the cause of the abnormal sound can be identified with higher accuracy by diagnosing the cause of the abnormal sound using the monitor data at the sound acquisition position.

Further, when the monitor data and the sound source estimation data coincide with each other, the user is notified of the determination result, so that the user can recognize that the generation position of the abnormal sound can be specified.

In the abnormal sound diagnosis system 1 of the present embodiment, when it is determined that there is an abnormal sound generation source in the vicinity of the sound acquisition position, the cause of the abnormal sound is diagnosed using the monitor data at the sound acquisition position determined that there is a sound generation source. However, the cause of the abnormal sound may be diagnosed based on the spectrogram acquired from the time-axis data of the sound outside the vehicle cabin without considering the sound acquisition position determined to have the sound generation source, and when the installation position of the device causing the abnormal sound coincides with the sound acquisition position, the device causing the abnormal sound may be determined. In this way, the cause of the abnormal sound can be identified more accurately.

In the abnormal sound diagnosis system 1 of the present embodiment, the determination result is transmitted to the mobile terminal 10 by S160, but the determination result may not be transmitted to the mobile terminal 10.

In the abnormal sound diagnosis system 1 of the present embodiment, the server 20 executes the determination processing routine of FIG. 4. However, some or all of the processing of the determination processing routine of FIG. 4 may be executed by the mobile terminal 10.

Although the embodiments for carrying out the present disclosure have been described above, the present disclosure is not limited to such embodiments at all, and it is needless to say that the present disclosure can be carried out in various forms without departing from the gist of the present disclosure.

The present disclosure is applicable to a manufacturing industry of an abnormal sound diagnosis system and the like.

What is claimed is:

1. An abnormal sound diagnosis system that diagnoses an abnormal sound generated in a vehicle, comprising:
    a storage unit that stores a database of body sensitivity data determined for each position of a sound source located outside a vehicle cabin as a ratio of a sound pressure of a sound propagated from the sound source into the vehicle cabin to a sound pressure of a sound generated by the sound source;
    a sound acquisition unit that acquires vehicle cabin internal sound data as data on a sound from inside the vehicle cabin and monitor data as data on a sound from outside the vehicle cabin;
    a body sensitivity acquisition unit that acquires the body sensitivity data corresponding to an acquisition position at which the monitor data are acquired;
    a sound source estimation unit that calculates sound source estimation data as data on a sound estimated as being generated from an abnormal sound generation source using the body sensitivity data and the vehicle cabin internal sound data; and
    a determination unit that determines that the abnormal sound generation source is located in a vicinity of the acquisition position when the monitor data and the sound source estimation data coincide with each other,
    wherein the storage unit stores a relationship between a frequency and the body sensitivity for each position of the sound source outside of the vehicle cabin.

2. The abnormal sound diagnosis system according to claim 1, further comprising a diagnosis unit that diagnoses a cause of the abnormal sound using the acquisition position when the monitor data and the sound source estimation data coincide with each other.

3. The abnormal sound diagnosis system according to claim 1, further comprising an informing unit that informs a user of a result of a determination by the determination unit when the monitor data and the sound source estimation data coincide with each other.

4. The abnormal sound diagnosis system according to claim 1, further comprising a diagnosis unit that diagnoses a cause of the abnormal sound generation source based on a spectrogram acquired from time-axis data of the sound outside the vehicle cabin without considering the acquisition position determined to have the sound generation source.

* * * * *